United States Patent
He et al.

(10) Patent No.: US 11,381,442 B2
(45) Date of Patent: Jul. 5, 2022

(54) TIME DOMAIN CHANNEL PREDICTION METHOD AND TIME DOMAIN CHANNEL PREDICTION SYSTEM FOR OFDM WIRELESS COMMUNICATION SYSTEM

(71) Applicant: WUHAN UNIVERSITY, Hubei (CN)

(72) Inventors: Yigang He, Hubei (CN); Yongbo Sui, Hubei (CN); Guolong Shi, Hubei (CN); Liulu He, Hubei (CN); Chaolong Zhang, Hubei (CN); Hui Shao, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/098,433

(22) Filed: Nov. 15, 2020

(65) Prior Publication Data

US 2021/0314206 A1 Oct. 7, 2021

(30) Foreign Application Priority Data

Apr. 3, 2020 (CN) .......................... 202010260603.0

(51) Int. Cl.
*H04L 27/26* (2006.01)
*G06N 20/00* (2019.01)
(Continued)

(52) U.S. Cl.
CPC ......... *H04L 27/2647* (2013.01); *G06N 20/00* (2019.01); *H04L 5/0007* (2013.01); *H04L 25/022* (2013.01); *H04L 27/2628* (2013.01)

(58) Field of Classification Search
None
See application file for complete search history.

(56) References Cited

U.S. PATENT DOCUMENTS

| 5,452,015 A * | 9/1995 | Hulyalkar ............ H04N 21/426 |
| | | 375/240.12 |
| 6,075,569 A * | 6/2000 | Lee ...................... H04N 21/443 |
| | | 348/554 |

(Continued)

FOREIGN PATENT DOCUMENTS

| CN | 105142177 | 12/2015 | |
| CN | 105142177 A * | 12/2015 | ............... G06N 3/02 |

(Continued)

OTHER PUBLICATIONS

T. E. Bogale, X. Wang and L. B. Le, "Adaptive Channel Prediction, Beamforming and Scheduling Design for 5G V2I Network," 2017 IEEE 86th Vehicular Technology Conference (VTC-Fall), 2017, pp. 1-5, doi: 10.1109/VTCFall.2017.8288275.*

(Continued)

*Primary Examiner* — Berhanu Tadese
(74) *Attorney, Agent, or Firm* — JCIPRNET

(57) ABSTRACT

Provided are a time domain channel prediction method and a time domain channel prediction system for an OFDM wireless communication system, which relate to the technical field of adaptive transmission in wireless communication. Frequency domain channel information is converted into time domain tap information by inverse Fourier transform. With respect to each time domain tap information, tap information prediction based on an extreme learning machine is realized, and finally predicted tap information is converted into frequency domain channel information by Fourier transform. To improve a generalization ability of a channel predictor, an output weight of the extreme learning machine is punished by a combination of $l_2$ regularization and $l_{1/2}$ regularization. The disclosure may provide satisfactory prediction performance and may output a sparse output weight, which reduces the requirement for memory storage.

(Continued)

US 11,381,442 B2

Page 2

The disclosure ensures adaptive transmission and adaptive coding of wireless communication.

8 Claims, 4 Drawing Sheets

(51) Int. Cl.
H04L 5/00 (2006.01)
H04L 25/02 (2006.01)

(56) References Cited

U.S. PATENT DOCUMENTS

| | | | |
|---|---|---|---|
| 7,386,072 B2* | 6/2008 | Uno | H04L 25/0204 370/204 |
| 9,107,105 B2* | 8/2015 | Zhang | H04L 25/0232 |
| 10,305,766 B1* | 5/2019 | Zhang | G08B 21/0484 |
| 10,979,097 B2* | 4/2021 | Luo | H04B 1/525 |
| 11,121,890 B2* | 9/2021 | He | H04L 27/261 |
| 11,128,498 B2* | 9/2021 | Tsiaflakis | G06N 20/00 |
| 2003/0232601 A1* | 12/2003 | Uno | H04L 27/2637 455/67.11 |
| 2005/0118955 A1* | 6/2005 | Denk | H04B 17/3913 455/65 |
| 2006/0013340 A1* | 1/2006 | Reid | H04L 25/022 375/340 |
| 2006/0293045 A1* | 12/2006 | LaDue | G06N 3/126 455/425 |
| 2007/0211747 A1* | 9/2007 | Kim | H04L 25/03343 370/437 |
| 2011/0069790 A1* | 3/2011 | Okehie | H04L 25/022 375/340 |
| 2012/0155577 A1* | 6/2012 | Shukla | H04L 25/022 375/316 |
| 2014/0181171 A1* | 6/2014 | Dourbal | G06F 17/16 708/607 |
| 2015/0172088 A1* | 6/2015 | Arambepola | H04L 25/03343 375/296 |
| 2015/0312008 A1* | 10/2015 | Annavajjala | H04L 25/022 370/252 |
| 2016/0013773 A1* | 1/2016 | Dourbal | G06F 17/16 708/209 |
| 2018/0034695 A1* | 2/2018 | Balasubramanian | G06N 3/04 |
| 2019/0049957 A1* | 2/2019 | Healey | G05D 1/0221 |
| 2019/0114557 A1* | 4/2019 | Ashrafi | G06N 3/063 |
| 2019/0191425 A1* | 6/2019 | Zhu | H04B 7/0695 |
| 2019/0243735 A1* | 8/2019 | He | G06N 3/006 |
| 2019/0385057 A1* | 12/2019 | Litichever | H04L 63/14 |
| 2020/0136700 A1* | 4/2020 | Bogale | H04B 7/0456 |
| 2020/0155015 A1* | 5/2020 | Ashrafi | A61B 5/7257 |
| 2021/0056355 A1* | 2/2021 | Luss | G06K 9/6201 |
| 2021/0110261 A1* | 4/2021 | Lee | H04L 5/0055 |
| 2021/0176093 A1* | 6/2021 | He | H04L 25/03165 |
| 2021/0194733 A1* | 6/2021 | Huangfu | H04L 25/0204 |
| 2021/0273707 A1* | 9/2021 | Yoo | H04L 1/0072 |
| 2021/0314197 A1* | 10/2021 | Ding | H04L 25/0212 |
| 2021/0314199 A1* | 10/2021 | He | H04L 25/0212 |
| 2021/0314206 A1* | 10/2021 | He | H04L 27/2628 |
| 2021/0315036 A1* | 10/2021 | Jang | H04L 1/1896 |
| 2021/0329547 A1* | 10/2021 | Kim | H04W 52/0216 |
| 2021/0329698 A1* | 10/2021 | Jang | H04W 80/02 |
| 2021/0329721 A1* | 10/2021 | Kim | H04W 76/15 |
| 2021/0344524 A1* | 11/2021 | Shikida | H04L 27/2662 |
| 2021/0398018 A1* | 12/2021 | Dao | G05B 17/02 |
| 2021/0410161 A1* | 12/2021 | Wang | H04L 1/18 |

FOREIGN PATENT DOCUMENTS

| | | | | |
|---|---|---|---|---|
| CN | 105142177 B | * | 8/2018 | G06N 3/02 |
| CN | 110995379 | | 4/2020 | |
| CN | 110995379 A | * | 4/2020 | H04B 17/373 |
| CN | 111541505 A | * | 8/2020 | G06F 17/16 |
| CN | 110995379 B | * | 3/2021 | H04B 17/373 |
| EP | 1355467 A1 | * | 10/2003 | H04L 25/0204 |
| EP | 1355467 B1 | * | 9/2005 | H04L 25/0204 |
| EP | 1355467 B8 | * | 12/2005 | H04L 25/0204 |
| EP | 3492945 A1 | * | 6/2019 | A61B 5/113 |
| KR | 2006038070 A | * | 5/2006 | H04L 25/0224 |
| WO | WO-03079688 A1 | * | 9/2003 | H04N 21/25891 |
| WO | WO-2013056435 A1 | * | 4/2013 | H04L 25/0222 |
| WO | WO-2017207472 A1 | * | 12/2017 | B22F 9/082 |
| WO | WO-2020088489 A1 | * | 5/2020 | H04B 17/373 |

OTHER PUBLICATIONS

T. E. Bogale, X. Wang and L. B. Le, "Adaptive Channel Prediction, Beamforming and Scheduling Design for 5G V2I Network: Analytical and Machine Learning Approaches," in IEEE Transactions on Vehicular Technology, vol. 69, No. 5, pp. 5055-5067, Publication date Feb. 24, 2020. (Year: 2020).*

W. Jiang, M. Strufe and H. Dieter Schotten, "Long-Range MIMO Channel Prediction Using Recurrent Neural Networks," 2020 IEEE 17th Annual Consumer Communications & Networking Conference (CCNC), 2020, pp. 1-6, doi: 10.1109/CCNC46108.2020.9045219.*

S. Kim, T. G. Kim and S. H. Kim, "Human Activity Recognition and Prediction Based on Wi-Fi Channel State Information and Machine Learning," 2019 International Conference on Artificial Intelligence in Information and Communication (ICAIIC), 2019, pp. 418-422, doi: 10.1109/ICAIIC.2019.8669046.*

Wong, et al., "Long range channel prediction for adaptive OFDM systems," in Proc. IEEE ACSSC, pp. 732-736, Nov. 2004. (Year: 2004).*

* cited by examiner

TIME DOMAIN CHANNEL PREDICTION METHOD AND TIME DOMAIN CHANNEL PREDICTION SYSTEM FOR OFDM WIRELESS COMMUNICATION SYSTEM

CROSS-REFERENCE TO RELATED APPLICATION

This application claims the priority benefit of China application serial no. 202010260603.0, filed on Apr. 3, 2020. The entirety of the above-mentioned patent application is hereby incorporated by reference herein and made a part of this specification.

BACKGROUND

Technical Field

The disclosure relates to the technical field of adaptive transmission in wireless communication, and more specifically, to a time domain channel prediction method and a time domain channel prediction system for an OFDM wireless communication system.

Description of Related Art

With the development of technology, adaptive transmission of wireless communication is one of the trends of future development. In an adaptive orthogonal frequency division multiplexing (OFDM) system, due to the rapid changes in the fading channels, the channel information fed back from the receiving end to the transmitting end may be outdated easily. Channel prediction is an essential technology for supporting adaptive transmission in OFDM systems.

Referring to China invention patent application no. 201510473741.6, a channel prediction method based on multiple neural networks is disclosed, and referring to China invention patent application no. 201911240969.5, a channel prediction system and a channel prediction method for an OFDM wireless communication system are disclosed. The above prediction methods are both frequency domain prediction methods. Considering the time-frequency characteristics of the OFDM system, time domain prediction has better performance than frequency domain prediction. Therefore, it is of great significance to provide effective time domain prediction for OFDM systems.

SUMMARY

In view of the above defects or requirements for improvement in the related art, the disclosure provides a time domain channel prediction method and a time domain channel prediction system for an OFDM wireless communication system, which solve the technical problem of how to provide effective time domain prediction for an OFDM system.

To achieve the above objective, an aspect of the disclosure provides a time domain channel prediction method for an OFDM wireless communication system, including the following steps.

OFDM frequency domain channel information is obtained by channel estimation, and time domain tap information is obtained by performing inverse Fourier transform on the OFDM frequency domain channel information.

Significant delay taps in a channel impulse response are filtered according to the time domain tap information.

Prediction is performed on each of the filtered significant delay taps by using a trained extreme learning machine to obtain next-moment time domain tap information of each of the significant delay taps.

The next-moment time domain tap information of each of the significant delay taps obtained by prediction is combined and then converted into predicted frequency domain channel information by using Fourier transform.

Exemplarily, the step of filtering the significant delay taps in the channel impulse response according to the time domain tap information includes the following step.

Delay taps in $L_{cp}$ are retained as the significant delay taps, and delay taps from $L_{cp}+1$ to K are discarded, where $L_{cp}$ is a length of a cyclic prefix of an OFDM system, and K is a number of subcarriers in an OFDM symbol.

Exemplarily, a training process of the trained extreme learning machine is as follows.

Numbers $N_p$ and L of neurons in an input layer and a hidden layer are set, and an input weight and a bias are randomly generated.

An extreme learning machine is trained according to $A_i \beta_i = B_i$, where $$A_i = \begin{bmatrix} g(\mu_{i,1}, v_{i,1}, h_{i,1})g(\mu_{i,2}, v_{i,2}, h_{i,1}) \cdots g(\mu_{i,L}, v_{i,L}, h_{i,1}) \\ \vdots \\ g(\mu_{i,1}, v_{i,1}, h_{i,N_T})g(\mu_{i,2}, v_{i,2}, h_{i,N_T}) \cdots g(\mu_{i,L}, v_{i,L}, h_{i,N_T}) \end{bmatrix}_{N_T \times L},$$

$$\beta_i = \begin{bmatrix} \beta_{i,1} \\ \vdots \\ \beta_{i,L} \end{bmatrix}_{L \times 1},$$

$$B_i = \begin{bmatrix} B_{i,1} \\ \vdots \\ B_{i,N_T} \end{bmatrix}_{N_T \times 1},$$

$N_T$ is a number of trained OFDM symbols, $A_i$ is a hidden layer output of the extreme learning machine of an $i^{th}$ significant delay tap, $\beta_i$ is an output weight matrix of the extreme learning machine of the $i^{th}$ significant delay tap, $B_i$ is an output matrix of the extreme learning machine of the $i^{th}$ significant delay tap, $g(*)$ is an activation function, $h_i$ is an input data of the extreme learning machine of the $i^{th}$ significant delay tap, $\mu_i$ is a weight of the input layer of the extreme learning machine of the $i^{th}$ significant delay tap, and $v_i$ is a bias of the extreme learning machine of the $i^{th}$ significant delay tap.

Exemplarily, a loss function of the extreme learning machine is $$J_i = \min_{\beta_i} \left( \sum_{j=1}^{N_T} (B_i(j) - A_i(j)\beta_i)^2 + \lambda_2 \|\beta_i\|_2^2 + \lambda_{1/2} \|\beta_i\|_{\frac{1}{2}}^{\frac{1}{2}} \right),$$

where $J_i$ represents a loss function of the extreme learning machine corresponding to the $i^{th}$ significant delay tap, $\lambda_2$ is a regularization coefficient of $l_2$ regularization, and $\lambda_{1/2}$ is a regularization coefficient of $l_{1/2}$ regularization.

Exemplarily, the method further includes the following step.

The loss function of the extreme learning machine is calculated by using a coordinate descent method to obtain an output weight of the extreme learning machine.

Another aspect of the disclosure provides a time domain channel prediction system for an OFDM wireless communication system, including a frequency domain channel estimation module, a time domain tap information obtaining module, a tap filter module, a time domain tap information prediction module, and a frequency domain channel information processing module.

The frequency domain channel estimation module is configured to obtain OFDM frequency domain channel information by channel estimation.

The time domain tap information obtaining module is configured to obtain time domain tap information by performing inverse Fourier transform on the OFDM frequency domain channel information.

The tap filter module is configured to filter significant delay taps in a channel impulse response according to the time domain tap information.

The time domain tap information prediction module is configured to perform prediction on each of the filtered significant delay taps by using a trained extreme learning machine to obtain next-moment time domain tap information of each of the significant delay taps.

The frequency domain channel information processing module is configured to combine the next-moment time domain tap information of each of the significant delay taps obtained by prediction, and then convert the next-moment time domain tap information into predicted frequency domain channel information by using Fourier transform.

Exemplarily, the tap filter module is configured to retain delay taps in $L_{cp}$ as the significant delay taps and discard delay taps from $L_{cp}+1$ to K, where $L_{cp}$ is a length of a cyclic prefix of an OFDM system, and K is a number of subcarriers in an OFDM symbol.

Exemplarily, the system further includes an initialization extreme learning machine module and a training module.

The initialization extreme learning machine module is configured to set numbers $N_p$ and L of neurons in an input layer and a hidden layer, and randomly generate an input weight and a bias.

The training module is configured to train an extreme learning machine according to $$A_i \beta_i = B_i,$$

where $A_i =$ $$\begin{bmatrix} g(\mu_{i,1}, v_{i,1}, h_{i,1}) g(\mu_{i,2}, v_{i,2}, h_{i,1}) & \cdots & g(\mu_{i,L}, v_{i,L}, h_{i,1}) \\ \vdots & & \\ g(\mu_{i,1}, v_{i,1}, h_{i,N_T}) g(\mu_{i,2}, v_{i,2}, h_{i,N_T}) & \cdots & g(\mu_{i,L}, v_{i,L}, h_{i,N_T}) \end{bmatrix}_{N_T \times L},$$

$$\beta_i = \begin{bmatrix} \beta_{i,1} \\ \vdots \\ \beta_{i,L} \end{bmatrix}_{L \times 1},$$

$$B_i = \begin{bmatrix} B_{i,1} \\ \vdots \\ B_{i,N_T} \end{bmatrix}_{N_T \times 1}$$

$N_T$ is a number of trained OFDM symbols, $A_i$ is a hidden layer output of the extreme learning machine of an $i^{th}$ significant delay tap, $\beta_i$ is an output weight matrix of the extreme learning machine of the $i^{th}$ significant delay tap, $B_i$ is an output matrix of the extreme learning machine of the $i^{th}$ significant delay tap, $g(*)$ is an activation function, $h_i$ is an input data of the extreme learning machine of the $i^{th}$ significant delay tap, $\mu_i$ is a weight of the input layer of the extreme learning machine of the $i^{th}$ significant delay tap, and $v_i$ is a bias of the extreme learning machine of the $i^{th}$ significant delay tap.

Exemplarily, a loss function of the extreme learning machine is $$J_i = \min_{\beta_i} \left( \sum_{j=1}^{N_T} (B_i(j) - A_i(j)\beta_i)^2 + \lambda_2 \|\beta_i\|_2^2 + \lambda_{1/2} \|\beta_i\|_{\frac{1}{2}}^{\frac{1}{2}} \right),$$

where $J_i$ represents a loss function of the extreme learning machine corresponding to the $i^{th}$ significant delay tap, $\lambda_2$ is a regularization coefficient of $l_2$ regularization, and $\lambda_{1/2}$ is a regularization coefficient of $l_{1/2}$ regularization.

Exemplarily, the system further includes a loss function calculation module.

The loss function calculation module is configured to calculate the loss function of the extreme learning machine by using a coordinate descent method to obtain an output weight of the extreme learning machine.

Another aspect of the disclosure provides a computer-readable storage medium on which program commands are stored. When the program commands are executed by a processor, the time domain channel prediction method for an OFDM wireless communication system as described above is realized.

In general, compared with the related art, the above technical solutions conceived in the disclosure can achieve the following advantageous effects.

In the time domain channel prediction of the OFDM wireless communication system of the disclosure, prediction may be performed on the filtered delay taps by using the improved extreme learning machine. To improve the performance of the extreme learning machine, in the disclosure, the output weight of the extreme learning machine is estimated by a combination of $l_2$ regularization and $l_{1/2}$ regularization. Therefore, the disclosure can achieve good prediction performance and can also generate a sparse output weight solution. The above lays the foundation for future adaptive communication technologies, such as adaptive coding, adaptive modulation, and adaptive prediction.

DESCRIPTION OF THE EMBODIMENTS

To provide a further understanding of the objectives, technical solutions, and advantages of the disclosure, the disclosure will be described in detail with reference to the accompanying drawings and embodiments. It is understood that the specific embodiments described herein are only used to illustrate the disclosure and are not intended to limit the disclosure. In addition, the technical features involved in the various embodiments of the disclosure described below may be combined with each other as long as they do not conflict with each other.

Figure 1:
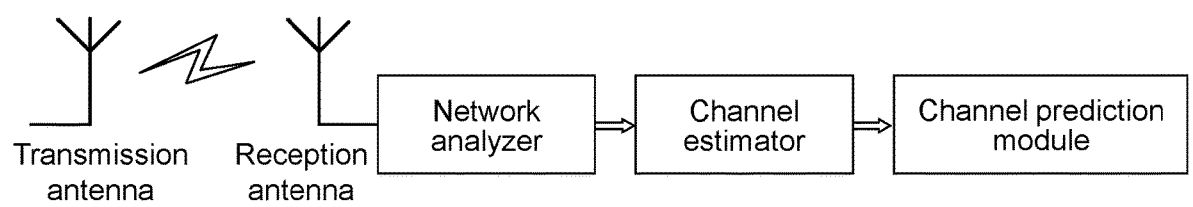
FIG. 1 is a device connection view according to an embodiment of the disclosure.

FIG. 1 shows an OFDM wireless communication system according to an embodiment of the disclosure, including a transmission antenna, a reception antenna, a network analyzer, a signal processor, and a channel prediction module.

The transmission antenna is configured to transmit a wireless signal.

The reception antenna is configured to receive a wireless signal.

The network analyzer is configured to analyze the wireless signal obtained by the reception antenna.

The signal processor is configured to perform channel estimation to obtain OFDM symbol frequency domain channel information.

The channel prediction module is configured to perform a channel prediction operation.

Figure 2:
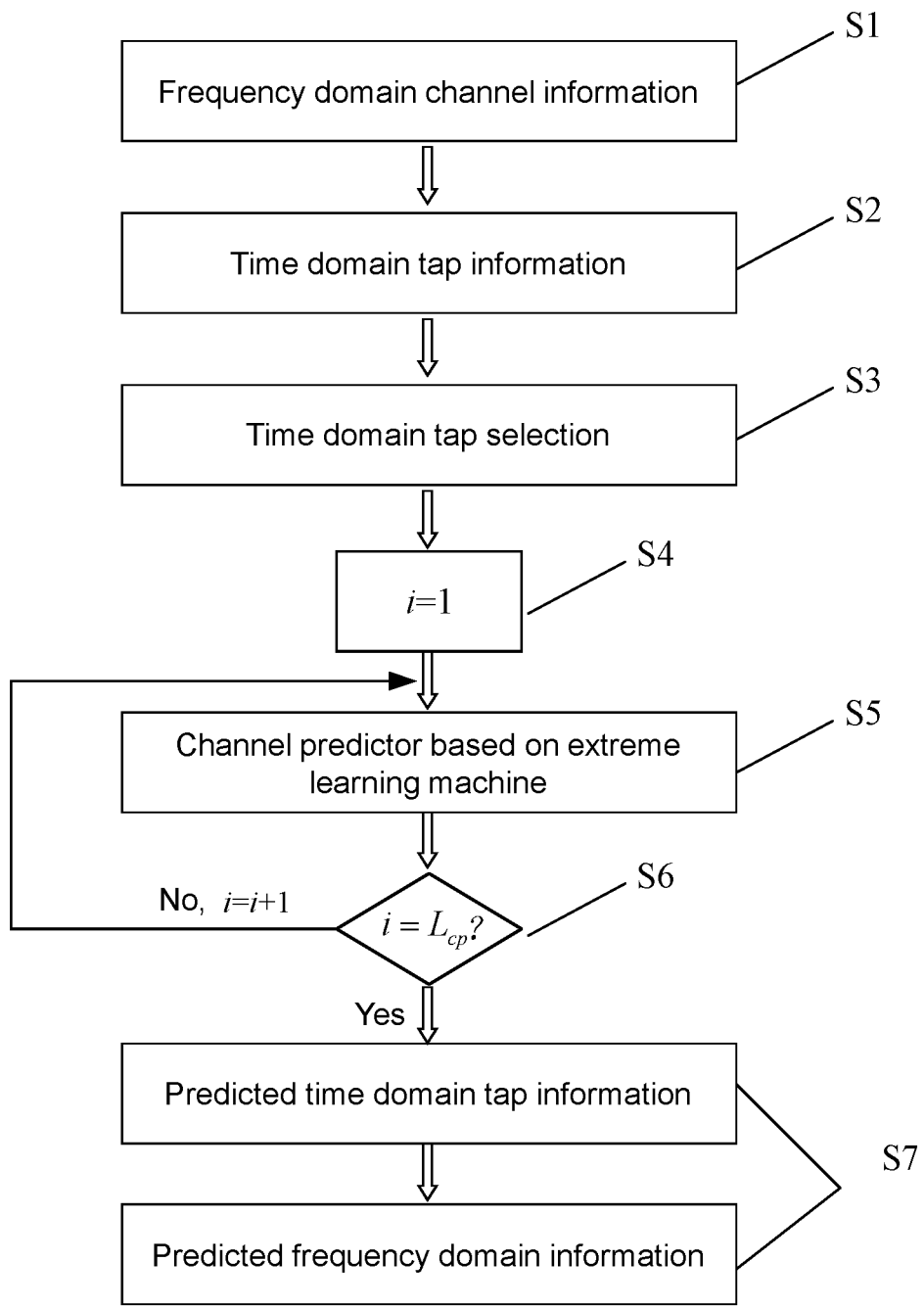
FIG. 2 is a flowchart of a time domain prediction method according to an embodiment of the disclosure.

FIG. 2 is a flowchart of a time domain channel prediction method for an OFDM wireless communication system according to an embodiment of the disclosure. The method includes the following steps.

Step S1: OFDM frequency domain channel information $H \in \Re^{K \times N}$ is obtained by channel estimation, where K is a number of subcarriers in an OFDM symbol, and N is a number of pilot OFDM symbols.

Step S2: Inverse Fourier transform is performed on the frequency domain channel information obtained by channel estimation to obtain time domain tap information $h \in \Re^{K \times N}$.

Step S3: Significant delay taps in a channel impulse response are filtered according to the obtained time domain tap information.

In the embodiment of the disclosure, the method for selecting the significant delay taps is retaining the delay taps in $L_{cp}$ and discarding the delay taps from $L_{cp}+1$ to K, where $L_{cp}$ is a length of a cyclic prefix of the OFDM system.

Step S4: A tap label i=1 is defined.

Step S5: Prediction is performed on an $i^{th}$ delay tap filtered and retained in Step S3 by using an improved extreme learning machine to obtain next-moment time domain tap information of the $i^{th}$ delay tap.

Specifically, with respect to the delay taps from $L_{cp}+1$ to K, the predicted delay tap information is directly set to 0.

In the embodiment of the disclosure, Step S5 may be specifically implemented in the following manner.

Step 51: Numbers $N_p$ and L of neurons of an input layer and a hidden layer are set.

Step 52: An input weight and a bias are randomly generated in a specific range.

Step 53: A training process of the improved extreme learning machine is:

$$A_i \beta_i = B_i \quad (1)$$

where $A_i =$ $$\begin{bmatrix} g(\mu_{i,1}, v_{i,1}, h_{i,1}) g(\mu_{i,2}, v_{i,2}, h_{i,1}) \cdots g(\mu_{i,L}, v_{i,L}, h_{i,L}) \\ \vdots \\ g(\mu_{i,1}, v_{i,1}, h_{i,N_T}) g(\mu_{i,2}, v_{i,2}, h_{i,N_T}) \cdots g(\mu_{i,L}, v_{i,L}, h_{i,N_T}) \end{bmatrix}_{N_T \times L}$$

$$\beta_i = \begin{bmatrix} \beta_{i,1} \\ \vdots \\ \beta_{i,L} \end{bmatrix}_{L \times 1},$$

$$B_i = \begin{bmatrix} B_{i,1} \\ \vdots \\ B_{i,N_T} \end{bmatrix}_{N_T \times 1}$$

where $N_T$ is a number of trained OFDM symbols, and $A_i$, $\beta_i$, and $B_i$ are respectively a hidden layer output, an output weight matrix, and an output matrix of the extreme learning machine, $g(*)$ is an activation function, $h_i$, $\mu_i$, and $v_i$ are respectively an input data, a weight of the input layer, and a bias of the improved extreme learning machine corresponding to the $i^{th}$ delay tap.

To improve a generalization ability of the extreme learning machine, the output weight is estimated by using a combination of $l_2$ regularization and $l_{1/2}$ regularization in the embodiment of the disclosure, namely:

$$J_i = \min_{\beta_i} \left( \sum_{j=1}^{N_T} (B_i(j) - A_i(j)\beta_i)^2 + \lambda_2 \|\beta_i\|_2^2 + \lambda_{1/2} \|\beta_i\|_{\frac{1}{2}}^{\frac{1}{2}} \right), \quad (2)$$

where $J_i$ represents a loss function of the improved extreme learning machine corresponding to the $i^{th}$ delay tap, and $B_i(j)$ represents the output matrix of the improved extreme learning machine corresponding to the $i^{th}$ delay tap, namely, $B_i(j)=h_i(j)$, $A_i(j)=[h_i(j-1), h_i(j-2), \ldots, h_i(j-N_p)]$, and $j=1, 2, \ldots, N_T$. $\lambda_2$ is a regularization coefficient of the $l_2$ regularization, and $\lambda_{1/2}$ is a regularization coefficient of the $l_{1/2}$ regularization.

The output weight of the improved extreme learning machine of the $i^{th}$ delay tap is solved by using a coordinate descent method, namely:

$$\|B_i - A_i \beta_i\| + \lambda_2 \|\beta_i\|_2^2 + \lambda_{1/2} \|\beta_i\|_{\frac{1}{2}}^{\frac{1}{2}} = \quad (3)$$

$$\left\| \begin{bmatrix} B_i \\ 0 \end{bmatrix} - \begin{pmatrix} A_i \\ \sqrt{\lambda_2} I \end{pmatrix} \beta_i \right\|_2^2 + \lambda_{1/2} \|\beta_i\|_{\frac{1}{2}}^{\frac{1}{2}} = \|B_i^\# - A_i^\# \beta_i\|_2^2 + \lambda_{1/2} \|\beta_i\|_{\frac{1}{2}}^{\frac{1}{2}}$$

where $$B_i^\# = \begin{bmatrix} B_i \\ 0 \end{bmatrix}, \quad (4)$$

$$A_i^\# = \begin{bmatrix} A_i \\ \sqrt{\lambda_2} I \end{bmatrix}$$

To solve Formula (2), the disclosure provides a derivation formula of the coordinate descent method, namely:

$$J_i(\beta_i) = \sum_{j=1}^{N_T} \left[ B_i^\#(j) - A_{i,\rho}^\#(j)\beta_{i,\rho} - \sum_{q \neq \rho}^{L} A_i^\#(j)\tilde{\beta}_{i,q} \right]^2 + \quad (5)$$

$$\lambda_{1/2} |\beta_{i,\rho}|^{\frac{1}{2}} + \lambda_{1/2} \sum_{q \neq \rho}^{L} |\tilde{\beta}_{i,q}|^{\frac{1}{2}}$$

where $\beta_{i,\rho}$ and $\tilde{\beta}_{i,q}$ are respectively a $\rho^{th}$ variable and another fixed variable of coordinate descent of the output weight of the improved extreme learning machine of the $i^{th}$ delay tap, and $A_{i,\rho}^\#(j)$ represents an input variable corresponding to the $\rho^{th}$ variable in the coordinate decent. The above formula may be formulated as:

$$J_i(\beta) = \sum_{j=1}^{N_T} (A_{i,\rho}^{\#}(j))^2 \beta_{i,\rho}^2 - 2\sum_{j=1}^{N_T} \left[ B_i^{\#}(j) - \sum_{q \neq \rho}^{L} A_i^{\#}(j)\tilde{\beta}_{i,q} \right]^2 A_{i,\rho}^{\#} + \quad (6)$$

$$\sum_{j=1}^{N_T} \left[ B_i^{\#}(j) - \sum_{q \neq \rho}^{L} A_i^{\#}(j)\tilde{\beta}_{i,q} \right]^2 + \lambda_{1/2}|\beta_{i,\rho}|^{\frac{1}{2}} + \lambda_{1/2}\sum_{q \neq \rho}^{L} |\tilde{\beta}_{i,q}|^{\frac{1}{2}}$$

Generally, the following formula is established, namely:

$$\sum_{j=1}^{N_T} (A_{i,\rho}^{\#}(j))^2 \neq 0 \text{ Therefore,} \quad (7)$$

$$J_i(\beta) = \beta_{i,\rho}^2 - 2\beta_{i,\rho} \frac{\sum_{j=1}^{N_T} \left[ B_i^{\#}(j) - \sum_{q \neq \rho}^{L} A_{i,q}^{\#}(j)\tilde{\beta}_q \right]^2 A_{i,\rho}^{\#}(j)}{\sum_{j=1}^{N_T} (A_{i,\rho}^{\#}(j))^2} + \quad (8)$$

$$\frac{\sum_{j=1}^{N_T} \left[ B_i^{\#}(j) - \sum_{q \neq \rho}^{L} A_{i,q}^{\#}(j)\tilde{\beta}_q \right]^2}{\sum_{j=1}^{N_T} (A_{i,\rho}^{\#}(j))^2} + \frac{\lambda_{1/2}|\beta_{i,\rho}|^{1/2}}{\sum_{j=1}^{N_T} (A_{i,\rho}^{\#}(j))^2} + \frac{\lambda_{1/2}|\beta_{i,q}|^{1/2}}{\sum_{j=1}^{N_T} (A_{i,\rho}^{\#}(j))^2}$$

The following may be further obtained:

$$J_i(\beta_i) = \quad (9)$$

$$\beta_{i,\rho}^2 - 2\beta_{i,\rho} \frac{\sum_{j=1}^{N_T} \left[ B_i^{\#}(j) - \sum_{q \neq \rho}^{L} A_{i,q}^{\#}(j)\tilde{\beta}_{i,q} \right]^2 A_{i,\rho}^{\#}(j)}{\sum_{j=1}^{N_T} (A_{i,\rho}^{\#}(j))^2} + \frac{\lambda_{1/2}|\beta_{i,\rho}|^{1/2}}{\sum_{j=1}^{N_T} (A_{i,\rho}^{\#}(j))^2}$$

The embodiment of the disclosure provides definitions, namely:

$$\mathring{A}_\rho = \frac{\sum_{j=1}^{N_T} \left[ B_i^{\#}(j) - \sum_{q \neq \rho}^{L} A_{i,q}^{\#}(j)\tilde{\beta}_{i,q} \right]^2 \tilde{\beta}_{i,\rho}(j)}{\sum_{j=1}^{N_T} (A_{i,\rho}^{\#}(j))^2} \quad (10)$$

$$B_\rho = \frac{\lambda_{1/2}}{\sum_{j=1}^{N_T} (A_{i,\rho}^{\#}(j))^2}$$

Therefore, $$\beta_{i,\rho} = \begin{cases} \frac{2}{3}\mathring{A}_\rho \left( 1 + \cos\left(\frac{2}{3}(\pi - \phi_\rho)\right) \right), & |\mathring{A}_\rho| \geq \frac{3}{4}B_\rho^{\frac{2}{3}} \\ 0, & |\mathring{A}_\rho| < \frac{3}{4}B_\rho^{\frac{2}{3}} \end{cases} \quad (11)$$

where $$\phi_\rho = \arccos\left( \frac{1}{8}\mathring{A}_\rho \left| \frac{B_\rho}{3} \right|^{\frac{2}{3}} \right) \quad (12)$$

Specifically, the process steps of the coordinate descent method in Step S5 are as follows.

1) A weight matrix $\beta$ and a zero matrix $\beta^{int}$ are initialized.
2) $\beta = \beta^{int}$.
3) A label n=1 is defined.
4) $\beta^{int} = \beta$.
5) $\beta_n$ is calculated according to Formula (11).

6) $\sum_{n=1}^{L} |\beta_n - \beta_n^{int}| \leq 10^{-8}$ is determined. If it is satisfied, then n=n+1 and Step 4) is executed. Otherwise, Step 5) is executed.

Step S6: It is determined whether i is equal to a maximum delay tap number $L_{cp}$. If not, then i=i+1, returning to Step S5.

Step S7: Fourier transform is performed on predicted time domain tap information $\hat{h} \in \mathbb{R}^{K \times 1}$ to obtain frequency domain prediction information $\hat{H} \in \mathbb{R}^{K \times 1}$.

Figure 3:
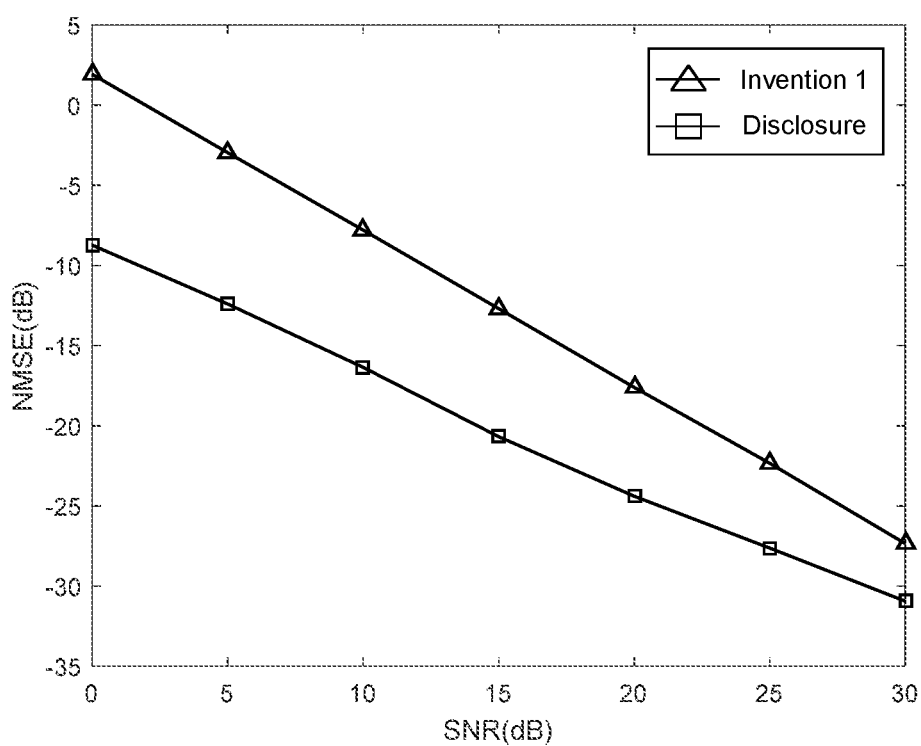
FIG. 3 shows the performance at different signal-to-noise ratios according to an embodiment of the disclosure.

To verify the validity of the disclosure, relevant parameters of the pilot OFDM symbol were set according to the 2 MHz mode in the IEEE802.11ah standard to set an SISO antenna. FIG. 3 shows a comparison of prediction performance at different signal-to-noise ratios. Invention 1 is "CHANNEL PREDICTION SYSTEM AND CHANNEL PREDICTION METHOD FOR OFDM WIRELESS COMMUNICATION SYSTEM" (China application no. 201911240969.5). It can be seen that the time domain channel prediction method disclosed herein has better performance.

Figure 4:
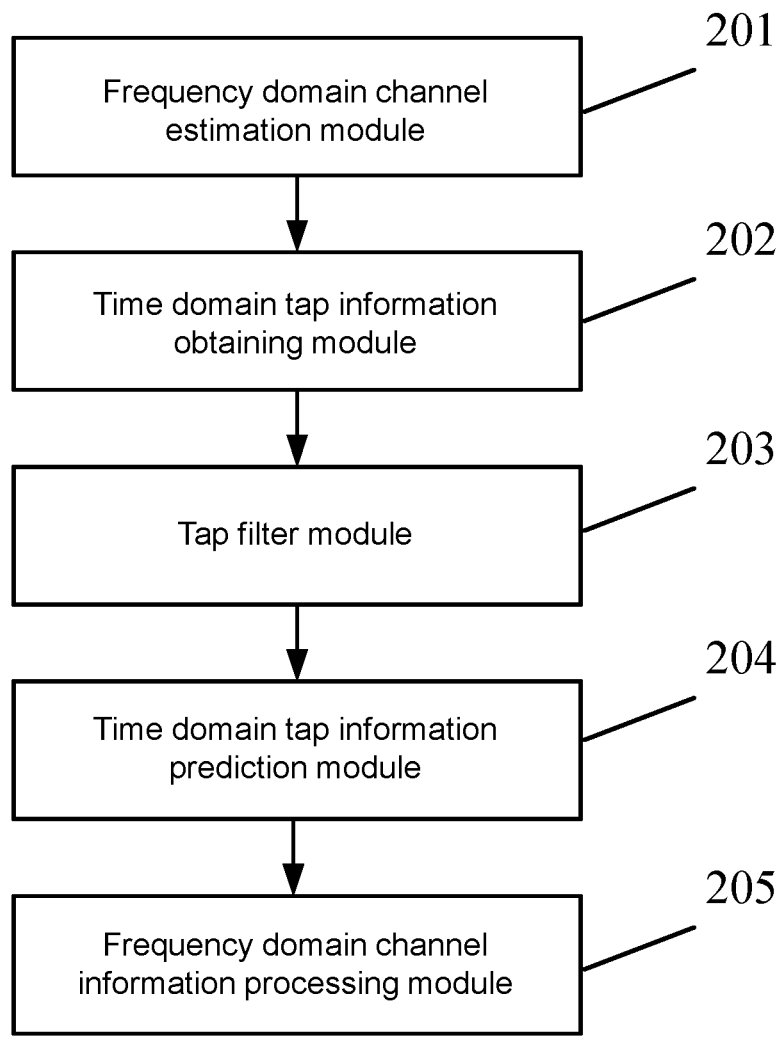
FIG. 4 shows a time domain channel prediction system for an OFDM wireless communication system according to an embodiment of the disclosure.

As shown in FIG. 4, in another embodiment of the disclosure, a time domain channel prediction system for an OFDM wireless communication system is also provided, including a frequency domain channel estimation module 201, a time domain tap information obtaining module 202, a tap filter module 203, a time domain tap information prediction module 204, and a frequency domain channel information processing module 205.

The frequency domain channel estimation module 201 is configured to obtain OFDM frequency domain channel information by channel estimation.

The time domain tap information obtaining module 202 is configured to obtain time domain tap information by performing inverse Fourier transform on the OFDM frequency domain channel information.

The tap filter module 203 is configured to filter significant delay taps in a channel impulse response according to the time domain tap information.

The time domain tap information prediction module 204 is configured to perform prediction on each of the filtered significant delay taps by using a trained extreme learning machine to obtain next-moment time domain tap information of each significant delay tap.

The frequency domain channel information processing module 205 is configured to combine the next-moment time domain tap information of each significant delay tap obtained by prediction, and then convert it into predicted frequency domain channel information by using Fourier transform.

Reference may be made to the above descriptions of the embodiment of the method for the specific implementation of each module, which will not be repeatedly described herein.

In another embodiment of the disclosure, a computer-readable storage medium on which program commands are stored is provided. When the program commands are executed by a processor, the time domain channel prediction method for the OFDM wireless communication system as described above is realized.

It is noted that, according to the implementation requirements, each step/component described herein may be separated into more steps/components, and two or more steps/components or partial operations of steps/components may be combined to form a new step/component to achieve the objective of the disclosure.

The above method according to the disclosure may be implemented in hardware or firmware, may be implemented as software or computer codes which may be stored in a recording medium (e.g., a CD ROM, a RAM, a floppy disk, a hard disk, or a magneto-optical disk), or may be implemented as computer codes which are originally stored in a remote recording medium or a non-transitory machine-readable medium and are downloaded via a network to be stored in a local recording medium. Therefore, the method described herein may be processed by such software stored on a recording medium using a general-purpose computer, a specific-purpose processor, or programmable or specific-purpose hardware (e.g., ASIC or FPGA). It can be understood that a computer, a processor, a microprocessor controller, or programmable hardware includes a storage component (e.g., a RAM, a ROM, a flash memory, etc.) which may store or receive software or computer codes. When the software or computer codes are accessed and executed by a computer, a processor, or hardware, the processing method described herein is realized. In addition, when a general-purpose computer accesses the codes for realizing the process shown herein, the execution of the codes converts the general-purpose computer into a specific-purpose computer for executing the process shown herein.

Those skilled in the art can easily understand that the above descriptions are only exemplary embodiments of the disclosure and are not intended to limit the disclosure. Any modification, equivalent replacement, and improvement made within the spirit and principle of the disclosure shall be included in the protection scope of the disclosure.

What is claimed is:

1. A time domain channel prediction method for an orthogonal frequency-division multiplexing (OFDM) wireless communication system, comprising:
    obtaining OFDM frequency domain channel information by channel estimation, and obtaining time domain tap information by performing inverse Fourier transform on the OFDM frequency domain channel information;
    filtering significant delay taps in a channel impulse response according to the time domain tap information, comprising: retaining delay taps in $L_{cp}$ as the significant delay taps and discarding delay taps from $L_{cp}+1$ to K, wherein $L_{cp}$ is a length of a cyclic prefix of an OFDM system, and K is a number of subcarriers in an OFDM symbol;
    performing prediction on each of the filtered significant delay taps by using a trained extreme learning machine to obtain next-moment time domain tap information of each of the significant delay taps; and
    combining the next-moment time domain tap information of each of the significant delay taps obtained by prediction, and then converting the next-moment time domain tap information into predicted frequency domain channel information by using Fourier transform.

2. The method according to claim 1, wherein a training process of the trained extreme learning machine comprises:
    setting numbers $N_p$ and L of neurons in an input layer and a hidden layer, and randomly generating an input weight and a bias; and
    training an extreme learning machine according to $A_i\beta_i=\beta_i$, wherein $$A_i = \begin{bmatrix} g(\mu_{i,1}, v_{i,1}, h_{i,1})g(\mu_{i,2}, v_{i,2}, h_{i,1}) \cdots g(\mu_{i,L}, v_{i,L}, h_{i,L}) \\ \vdots \\ g(\mu_{i,1}, v_{i,1}, h_{i,N_T})g(\mu_{i,2}, v_{i,2}, h_{i,N_T}) \cdots g(\mu_{i,L}, v_{i,L}, h_{i,N_T}) \end{bmatrix}_{N_T \times L},$$

$$\beta_i = \begin{bmatrix} \beta_{i,1} \\ \vdots \\ \beta_{i,L} \end{bmatrix}_{L \times 1},$$

$$B_i = \begin{bmatrix} B_{i,1} \\ \vdots \\ B_{i,N_T} \end{bmatrix}_{N_T \times 1},$$

$N_T$ is a number of trained OFDM symbols, $A_i$ is a hidden layer output of the extreme learning machine of an $i^{th}$ significant delay tap, $\beta_i$ is an output weight matrix of the extreme learning machine of the $i^{th}$ significant delay tap, $B_i$ is an output matrix of the extreme learning machine of the $i^{th}$ significant delay tap, $g(*)$ is an activation function, $h_i$ is an input data of the extreme learning machine of the $i^{th}$ significant delay tap, $\mu_i$ is a weight of the input layer of the extreme learning machine of the $i^{th}$ significant delay tap, and $v_i$ is a bias of the extreme learning machine of the $i^{th}$ significant delay tap.

3. The method according to claim 2, wherein a loss function of the extreme learning machine is $$J_i = \min_{\beta_i} \left( \sum_{j=1}^{N_T} (B_i(j) - A_i(j)\beta_i)^2 + \lambda_2 \|\beta_i\|_2^2 + \lambda_{1/2} \|\beta_i\|_{\frac{1}{2}}^{\frac{1}{2}} \right),$$

wherein $J_i$ represents a loss function of the extreme learning machine corresponding to the $i^{th}$ significant delay tap, $\lambda_2$ is a regularization coefficient of $l_2$ regularization, and $\lambda_{1/2}$ is a regularization coefficient of $l_{1/2}$ regularization.

4. The method according to claim 3, further comprising:
    calculating the loss function of the extreme learning machine by using a coordinate descent method to obtain an output weight of the extreme learning machine.

5. A time domain channel prediction system for an orthogonal frequency-division multiplexing (OFDM) wireless communication system, comprising:
    a computer-readable storage medium storing a plurality of modules; and
    a processor coupled to the computer-readable storage medium, and accessed and executes the plurality of modules, wherein the plurality of modules comprise:
    a frequency domain channel estimation module configured to obtain OFDM frequency domain channel information by channel estimation;

a time domain tap information obtaining module configured to obtain time domain tap information by performing inverse Fourier transform on the OFDM frequency domain channel information;

a tap filter module configured to filter significant delay taps in a channel impulse response according to the time domain tap information by retaining delay taps in $L_{cp}$ as the significant delay taps and discarding delay taps from $L_{cp}+1$ to K, wherein $L_{cp}$ is a length of a cyclic prefix of an OFDM system, and K is a number of subcarriers in an OFDM symbol;

a time domain tap information prediction module configured to perform prediction on each of the filtered significant delay taps by using a trained extreme learning machine to obtain next-moment time domain tap information of each of the significant delay taps; and a frequency domain channel information processing module configured to combine the next-moment time domain tap information of each of the significant delay taps obtained by prediction, and then convert the next-moment time domain tap information into predicted frequency domain channel information by using Fourier transform.

6. The system according to claim 5, wherein the plurality of modules further comprising:

an initialization extreme learning machine module configured to set numbers $N_p$ and L of neurons in an input layer and a hidden layer, and randomly generate an input weight and a bias; and a training module configured to train an extreme learning machine according to $A_i\beta_i = B_i$, wherein $$A_i = \begin{bmatrix} g(\mu_{i,1}, v_{i,1}, h_{i,1})g(\mu_{i,2}, v_{i,2}, h_{i,1}) \cdots g(\mu_{i,L}, v_{i,L}, h_{i,L}) \\ \vdots \\ g(\mu_{i,1}, v_{i,1}, h_{i,N_T})g(\mu_{i,2}, v_{i,2}, h_{i,N_T}) \cdots g(\mu_{i,L}, v_{i,L}, h_{i,N_T}) \end{bmatrix}_{N_T \times L},$$

$$\beta_i = \begin{bmatrix} \beta_{i,1} \\ \vdots \\ \beta_{i,L} \end{bmatrix}_{L \times 1},$$

$$B_i = \begin{bmatrix} B_{i,1} \\ \vdots \\ B_{i,N_T} \end{bmatrix}_{N_T \times 1},$$

$N_T$, is a number of trained OFDM symbols, $A_i$ is a hidden layer output of the extreme learning machine of an $i^{th}$ significant delay tap, $\beta_i$ is an output weight matrix of the extreme learning machine of the $i^{th}$ significant delay tap, $B_i$ is an output matrix of the extreme learning machine of the $i^{th}$ significant delay tap, g(*) is an activation function, $h_i$ is an input data of the extreme learning machine of the $i^{th}$ significant delay tap, $\mu_i$ is a weight of the input layer of the extreme learning machine of the $i^{th}$ significant delay tap, and $v_i$ is a bias of the extreme learning machine of the $i^{th}$ significant delay tap.

7. The system according to claim 6, wherein a loss function of the extreme learning machine is $$J_i = \min_{\beta_i}\left(\sum_{j=1}^{N_T}(B_i(j) - A_i(j)\beta_i)^2 + \lambda_2\|\beta_i\|_2^2 + \lambda_{1/2}\|\beta_i\|_{\frac{1}{2}}^{\frac{1}{2}}\right),$$

wherein $J_1$ represents a loss function of the extreme learning machine corresponding to the $i^{th}$ significant delay tap, $\lambda_2$ is a regularization coefficient of $l_2$ regularization, and $\lambda_{1/2}$ is a regularization coefficient of $l_{1/2}$ regularization.

8. The system according to claim 7, wherein the plurality of modules further comprising:

a loss function calculation module configured to calculate the loss function of the extreme learning machine by using a coordinate descent method to obtain an output weight of the extreme learning machine.

* * * * *